(12) United States Patent
Shim et al.

(10) Patent No.: US 11,419,075 B2
(45) Date of Patent: Aug. 16, 2022

(54) METHOD AND APPARATUS FOR TRANSCEIVING DATA IN WIRELESS COMMUNICATION SYSTEM

(71) Applicant: Samsung Electronics Co., Ltd., Suwon-si (KR)

(72) Inventors: Seijoon Shim, Suwon-si (KR); Hayoung Yang, Suwon-si (KR); Chongdon Kim, Suwon-si (KR); Byungjoon Park, Suwon-si (KR); Myeongcheol Shin, Suwon-si (KR); Joohyun Lee, Suwon-si (KR); Chanho Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 16/971,905

(22) PCT Filed: Feb. 27, 2019

(86) PCT No.: PCT/KR2019/002363
§ 371 (c)(1),
(2) Date: Aug. 21, 2020

(87) PCT Pub. No.: WO2019/168343
PCT Pub. Date: Sep. 6, 2019

(65) Prior Publication Data
US 2021/0105730 A1 Apr. 8, 2021

(30) Foreign Application Priority Data
Feb. 28, 2018 (KR) .................. 10-2018-0024869

(51) Int. Cl.
*H04W 56/00* (2009.01)
*H04W 72/04* (2009.01)

(52) U.S. Cl.
CPC ......... *H04W 56/001* (2013.01); *H04W 72/04* (2013.01)

(58) Field of Classification Search
CPC ... H04W 56/001; H04W 72/04; H04W 48/16; H04W 48/12
See application file for complete search history.

(56) References Cited

U.S. PATENT DOCUMENTS

| 2009/0232126 A1 | 9/2009 | Cordeiro et al. |
| 2015/0156621 A1 | 6/2015 | Mueck et al. |

(Continued)

FOREIGN PATENT DOCUMENTS

| CN | 103532901 A | 1/2014 |
| CN | 103581841 A | 2/2014 |

(Continued)

OTHER PUBLICATIONS

Samsung, "Corrections on DL/UL Resource Allocation," 3GPP TSG RAN WG1 Meeting AH1801, R1-1800451, Vancouver, Canada, Jan. 22-26, 2018.

(Continued)

*Primary Examiner* — Brian D Nguyen
(74) *Attorney, Agent, or Firm* — Jefferson IP Law, LLP

(57) ABSTRACT

The present disclosure relates to a 5G or pre-5G communication system for supporting a higher data transmission rate than a 4G communication system such as LTE. A method for transmitting and receiving data comprises the steps of: receiving a first synchronization block over a first narrow band; identifying whether an indicator indicating that the first narrow band is not allocated to a terminal is included in the first synchronization block; and performing synchronization in the first narrow band if the indicator indicating that the first narrow band is not allocated to the terminal is not included in the first synchronization block.

20 Claims, 11 Drawing Sheets

(56) References Cited

U.S. PATENT DOCUMENTS

| | | | |
|---|---|---|---|
| 2015/0230261 | A1 | 8/2015 | Lo et al. |
| 2016/0119964 | A1 | 4/2016 | Cho et al. |
| 2016/0234759 | A1 | 8/2016 | Kubota et al. |
| 2017/0094621 | A1 | 3/2017 | Xu et al. |
| 2017/0223652 | A1 | 8/2017 | Ko et al. |
| 2018/0176788 | A1 | 6/2018 | Yeo et al. |
| 2019/0053235 | A1* | 2/2019 | Novlan ............... H04L 43/0876 |
| 2019/0159179 | A1 | 5/2019 | Liu et al. |
| 2019/0223227 | A1* | 7/2019 | Jiang ................ H04W 74/0841 |
| 2020/0236677 | A1* | 7/2020 | Cui ....................... H04W 24/02 |
| 2020/0374725 | A1* | 11/2020 | Chen ..................... H04L 5/0051 |
| 2020/0389922 | A1* | 12/2020 | Xu ........................ H04W 76/27 |

FOREIGN PATENT DOCUMENTS

| | | |
|---|---|---|
| CN | 103684675 A | 3/2014 |
| CN | 107040987 A | 8/2017 |
| CN | 107371240 A | 11/2017 |
| EP | 3 161 975 | 5/2017 |
| KR | 10-2014-0136360 A | 11/2014 |
| KR | 10-2016-0149082 A | 12/2016 |
| WO | 2015/006082 A1 | 1/2015 |
| WO | 2015/200804 A1 | 12/2015 |
| WO | 2017/053024 A1 | 3/2017 |
| WO | 2018/017201 A1 | 1/2018 |

OTHER PUBLICATIONS

CATT, "Remaining aspects of BWP operation," 3GPP TSG RAN WG1 Meeting #90bis, R1-1717839, Prague, Czechia, Oct. 9-13, 2017.

Rubing et al., "A Survey of Several Key Technologies of Connection Admission Control in Wireless Network Environment," College of Science, South China Agricultural University, Guangzhou, 2011.

Chinese Office Action dated Jan. 24, 2022, issued in Chinese Application No. 201980015552.0.

3GPP; TSGRAN; NR Radio Resource Control (RRC) protocol specification (Release 15), 3GPP TS 38.331 V15.0.0, Jan. 4, 2018.

CATT, 'Remaining aspects of BWP operation', R1-1717839, 3GPP TSG RAN WG1 Meeting #90bis, Prague, Czechia, Oct. 3, 2017.

* cited by examiner

METHOD AND APPARATUS FOR TRANSCEIVING DATA IN WIRELESS COMMUNICATION SYSTEM

CROSS-REFERENCE TO RELATED APPLICATION(S)

This application is a National Phase Entry of PCT International Application No. PCT/KR2019/002363, which was filed on Feb. 27, 2019, and claims priority under 35 U.S.C. § 119 of Korean Patent Application No. 10-2018-0024869, filed on Feb. 28, 2018 in the Korean Intellectual Property Office the disclosure of which is incorporated herein by reference in its entirety.

TECHNICAL FIELD

Various embodiments of the present disclosure relate to a method and apparatus to transmit and receive data in a wireless communication system, and more particularly, to a method and apparatus to transmit and receive control information for transmitting and receiving data in a wireless communication system.

BACKGROUND ART

To meet the demand for wireless data traffic, which has increased since deployment of 4th-Generation (4G) communication systems, efforts have been made to develop an improved 5th-Generation (5G) or pre-5G communication system. Therefore, the 5G or pre-5G communication system is also called a beyond 4G network communication system or a post LTE system.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device communication (D2D), a wireless backhaul, a moving network, a cooperative communication, coordinated multi-points (CoMP), reception-end interference cancellation, and/or the like.

In a 5G system, a hybrid FSK and QAM modulation (FQAM) and a sliding window superposition coding (SWSC) as an advanced coding modulation (ACM) scheme, and a filter bank multi carrier (FBMC), a non-orthogonal multiple access (NOMA), a sparse code multiple access (SCMA), and/or the like as advanced access technologies have been developed.

Recently, interest in technologies such as Internet-of-Thing (IoT), artificial intelligence (AI), and/or the like has increased. These technologies are based on transmission and reception of a specific message or signal, so a desire for development of wireless communication technologies is greater than ever. Resources for a wireless communication are finite, so capabilities of wireless communication technologies are concentrated on developing a method for efficiently utilizing the resources for the wireless communication.

DETAILED DESCRIPTION OF THE INVENTION

Technical Problem

[1] The present disclosure provides a method and apparatus to transmit and receive data for effectively using a wireless communication resource.

Technical Solution

A method to transmit and receive data according to an embodiment of the present disclosure includes receiving a first synchronization block through a first narrow band predefined for transmitting and receiving the data; identifying whether an indicator indicating that the first narrow band is not allocated to the terminal is included in a predefined resource of the first synchronization block; and performing synchronization in the first narrow band if the indicator indicating that the first narrow band is not allocated to the terminal is not included in the predefined resource of the first synchronization block.

A terminal according to an embodiment of the present disclosure includes a transceiver; and a processor configured to: control the transceiver to receive a first synchronization block through a first narrow band predefined for transmitting and receiving data; identify whether an indicator indicating that the first narrow band is not allocated to the terminal is included in a predefined resource of the first synchronization block; and perform synchronization in the first narrow band in case that the indicator indicating that the first narrow band is not allocated to the terminal is not included in the predefined resource of the first synchronization block.

A method to transmit and receive data according to another embodiment of the present disclosure may include generating a first synchronization block, and transmitting the first synchronization block to a terminal through a first narrow band predefined for transmitting and receiving the data. In this case, synchronization is performed in the first narrow band if an indicator indicating that the first narrow band is not allocated to the terminal is not included in a predefined resource of the first synchronization block.

A base station according to an embodiment of the present disclosure may include a transceiver; and a processor configured to generate a first synchronization block, and to control the transceiver to transmit the first synchronization block to a terminal through a first narrow band predefined for transmitting and receiving data. Herein, synchronization may be performed in the first narrow band if an indicator indicating that the first narrow band is not allocated to the terminal is not included in a predefined resource of the first synchronization block.

A method to transmit and receive data according to still another embodiment of the present disclosure may include receiving size information for a message received at the terminal through system information; and decoding the message received at the terminal based on the size information for the message received at the terminal. Herein, the message received at the terminal may be allocated to a non-allocated resource other than a resource to which a channel for a synchronization signal is allocated and a resource to which a broadcast channel is allocated, among resources of a synchronization block received through a narrow band predefined for transmitting and receiving the data, and then be received.

A terminal according to still another embodiment of the present disclosure may include a transceiver; and a processor configured to control the transceiver to receive size information for a message received at a terminal through system information, and decode the message received at the terminal based on the size information for the message received at the terminal. Herein, the message received at the terminal may be allocated to a non-allocated resource other than a resource to which a channel for a synchronization signal is allocated and a resource to which a broadcast channel is allocated, among resources of a synchronization block received through a narrow band predefined for transmitting and receiving data, and then be received.

A method to transmit and receive data according to still another embodiment of the present disclosure may include receiving type information of a configuration for a predefined resource through system information; receiving control information for receiving the data through the predefined resource based on the received type information; and receiving the data based on the control information. Herein, the predefined resource may be related to a non-allocated resource other than a resource to which a channel for a synchronization signal is allocated and a resource to which a broadcast channel is allocated, among resources of a synchronization block received through a narrow band predefined for transmitting and receiving the data.

A terminal according to another embodiment of the present disclosure may include a transceiver; and a processor configured to: control the transceiver to receive type information of a configuration for a predefined resource through system information, receive control information for receiving the data through the predefined resource based on the received type information, and receive the data based on the control information. Herein, the predefined resource may be a non-allocated resource other than a resource to which a channel for a synchronization signal is allocated and a resource to which a broadcast channel is allocated, among resources of a synchronization block received through a narrow band predefined for transmitting and receiving the data.

Effect of the Invention

As described above, according to the present disclosure, a message or signal may be transmitted and received by efficiently utilizing a wireless communication resource.

MODE FOR CARRYING OUT THE INVENTION

In the following description of the present disclosure, if it is determined that a detailed description of related known functions or configurations may unnecessarily obscure the subject matter of the present disclosure, the detailed description will be omitted. Hereinafter, embodiments of the present disclosure will be described with reference to the accompanying drawings.

For convenience of a description below, the present disclosure uses terms and names defined in the 3rd Generation Partnership Project (3GPP) Long Term Evolution (LTE) standard, which is the most recent standard among communication standards which currently exist. However, the present disclosure is not limited by the terms and names, and may be equally applied to a system following other standards. The present disclosure may be applied to 3GPP new radio (NR) (the 5th generation mobile communication standard).

In various embodiments of the present disclosure, if it is described that an operation is performed by a terminal, a base station, or various entities, it may be read that the operation is performed by at least one processor, a controller, a transceiver, etc. included in the terminal, the base station, or the various entities.

Figure 1:
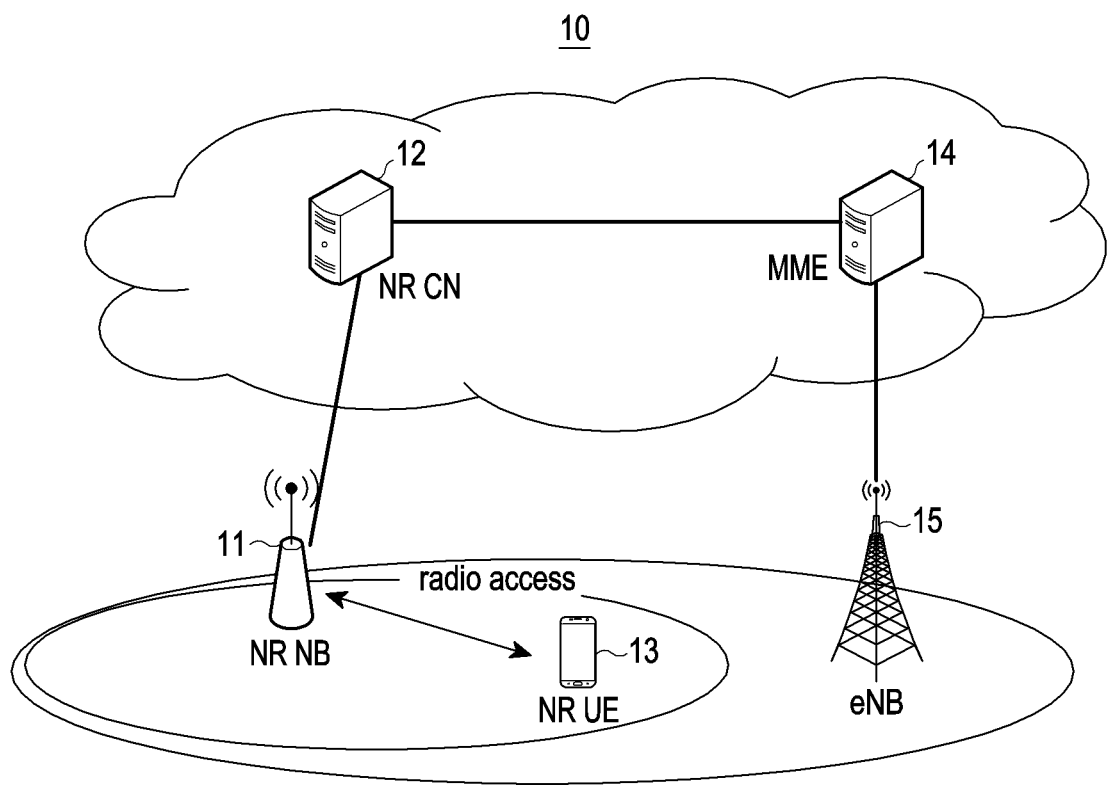
FIG. 1 illustrates a next generation mobile communication system according to an embodiment of the present disclosure.

FIG. 1 illustrates a next generation mobile communication system according to an embodiment of the present disclosure.

New Radio (NR) is a 5G communication standard, and is a standard specification that progresses in a 3GPP group to support a communication in various environments, for example, an IoT, a machine-type communication, a mobile broadband, and/or the like.

Referring to FIG. 1, a radio access network 10 may be configured as a next generation mobile communication system 10. The next generation mobile communication system 10 may include at least a new radio node B (hereinafter, referred to as an NR NB) 11 and a new radio core network (NR CN) 12. A user terminal (new radio user equipment (NR UE), hereinafter, referred to as an NR UE or a terminal) 13 may be connected to an external network through the NR NB 11 and the NR CN 12.

For example, the NR NB 11 corresponds to an evolved node B (eNB) of an LTE system. The NR NB 11 may be connected to the NR UE 13 through a radio channel. The NR NB 11 may provide a service having a level higher than a node B.

In the next generation mobile communication system 10, most (or all) user traffic may be serviced through a shared channel. Therefore, in the next generation mobile communication system 10, a component (or a device) for collecting state information such as buffer states, available transmission power states, and channel states, etc., of UEs and performing scheduling is required. The NR NB 11 may be in charge of this scheduling.

One NR NB 11 may generally control a plurality of cells. The next generation mobile communication system 10 may have a bandwidth wider than or equal to a maximum bandwidth of LTE to implement ultra high-speed data transmission compared to the LTE. In addition, the next generation mobile communication system 10 may use an orthogonal frequency division multiplexing (OFDM) scheme as a radio access technology. In addition, the next generation mobile communication system 10 may use a beamforming technology. The next generation mobile communication system 10 may apply an adaptive modulation & coding (AMC) scheme for determining a modulation scheme and a channel coding rate according to a state of the terminal 13. The NR CN 12 may perform a function such as mobility support, bearer setup, QoS setup, and/or the like. The NR CN 12 may be a device which is in charge of various control functions as well as a mobility management function for a terminal. In addition, the NR CN 12 may be connected to a plurality of base stations. The next generation mobile communication system 10 may be interworked with the LTE system. Also, the NR CN 12 may be connected to an MME 14 through a network interface. Of course, the MME 14 may be connected to an eNB 15 which is an existing base station.

Figure 2:
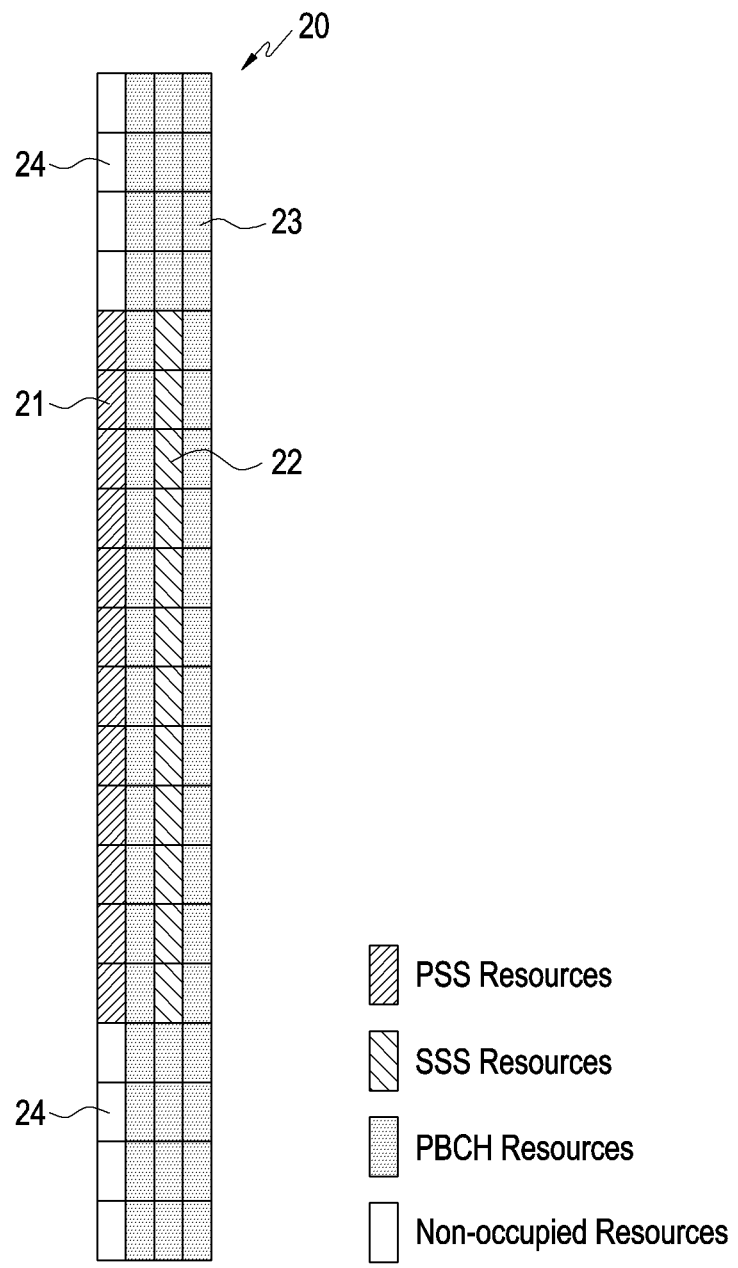
FIG. 2 illustrates a synchronization signal block according to an embodiment of the present disclosure.

FIG. 2 illustrates a synchronization signal block according to an embodiment of the present disclosure.

A signal or a channel required for downlink synchronization is allocated to a synchronization signal block (a synchronization signal/PBCH block (SSB)). For example, the SSB may be a synchronization signal and broadcast data transport block which needs to be periodically transmitted for purpose of synchronization between a base station and a terminal in an NR specification. In a case of NR, an SSB transmission period may be determined by default. In addition, the SSB transmission period and the number of retransmissions may be set by an operator (or a provider).

According to an embodiment of the present disclosure, the synchronization signal block may include at least a primary synchronization signal (PSS), a secondary synchronization signal (SSS), and a physical broadcast channel (PBCH).

For example, each of a PSS 21 and an SSS 22 may be allocated to 12 resource blocks (RBs) (1 RB includes 12 subcarriers). In this case, each of a PSS and an SSS may be allocated to one OFDM symbol.

For example, a PBCH 23 may be allocated to 20 RBs per OFDM symbol, and may be allocated to each of 4 RBs symmetric with respect to the RBs to which the SSS 22 is allocated on the OFDM symbol to which the SSS 22 is allocated (48 RBs in total).

An SSB 20 may include a resource (or a block) to which the PSS 21, the SSS 22, and the PBCH 23 are not allocated. Herein, a non-occupied resource (NOR) 24 is defined as the resource to which the PSS 21, the SSS 22, and the PBCH 23 are not allocated in the SSB 20. The NOR 24 may be defined as a resource other than resources to which a channel for a synchronization signal and a broadcast channel are allocated in an SSB.

For example, referring to FIG. 2, the NOR 24 may be 8 RBs.

According to various embodiments of the present disclosure, the NOR 24 described above may be efficiently utilized. According to one embodiment, the NOR 24 may be used to transmit a message or signal with specific purpose. For example, the message may include specific data to be transmitted. The signal may be an identifier, for example, cell identification (ID) (a cell radio network temporary identifier (C-RNTI), or various RNTIs, and/or the like).

In this case, a desired message or signal may be transmitted without wasting additional resources. According to this, spectral efficiency of a wireless communication environment may be improved.

Hereinafter, various embodiments of transmitting a message or signal with specific purpose using a NOR will be described in detail.

Figure 3:
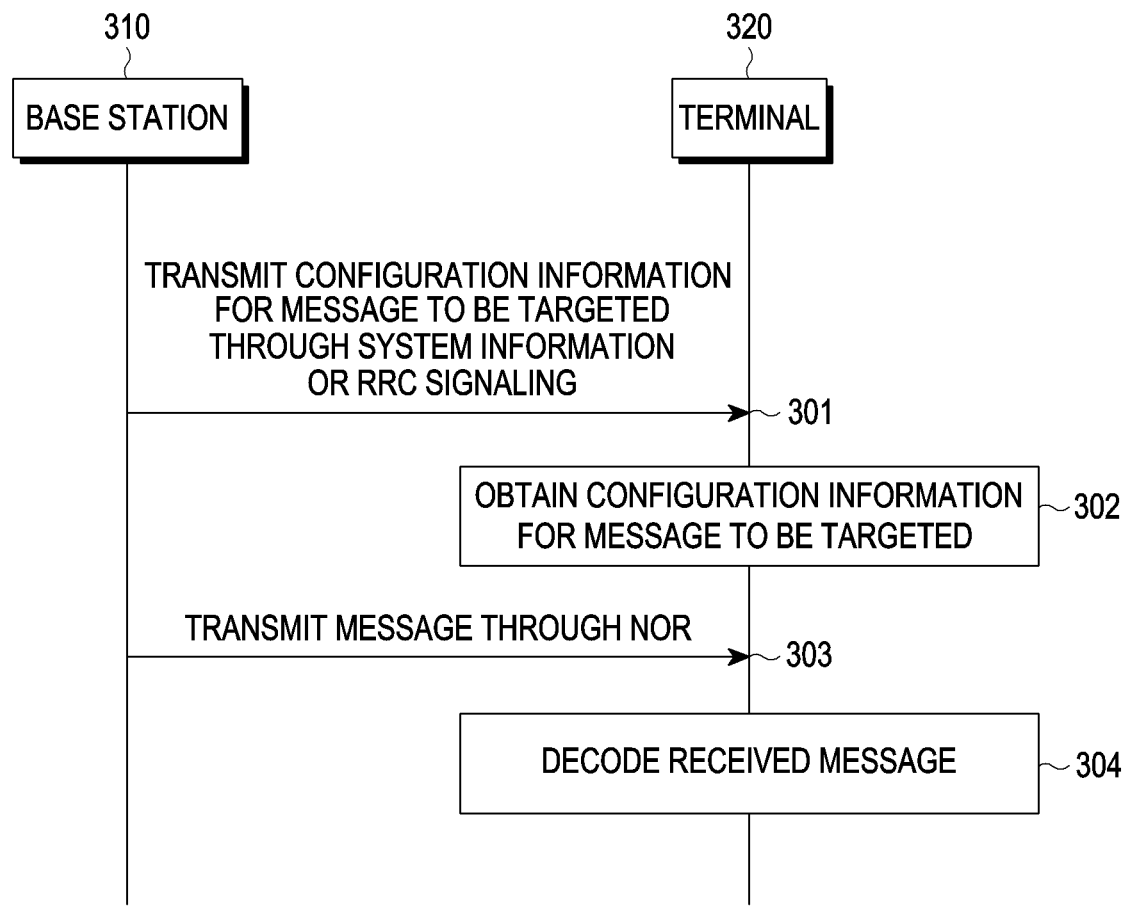
FIG. 3 is a flowchart for a message transmission method according to an embodiment of the present disclosure.

FIG. 3 is a flowchart for a message transmission method according to an embodiment of the present disclosure.

FIG. 3 shows an embodiment of a scheme of transmitting a message to be targeted based on allocation information for a resource which is fixedly allocated between a base station and a terminal.

According to an embodiment of the present disclosure, a base station 310 (for example, it may be referred to as an NR NB, an eNB, a next generation nodeB (gNB), etc., but is not limited thereto) transmits (301) configuration information for a message to be targeted to a terminal 320 (it may be referred to as a mobile station, a user equipment, etc., but is not limited thereto) through system information or RRC signaling.

Herein, the configuration information for the message to be targeted may include information about a payload size, a modulation order, a modulation and coding scheme (MCS), and/or the like. Herein, the payload size may be adjusted through the configuration information for the message to be targeted according to a system setting.

Also, the terminal 320 obtains payload size information (302). The base station 310 transmits a message (or message data or control information) to the terminal 320 through a NOR. The terminal 320 decodes a received message. Herein, a payload of the message to be targeted (or message data to be targeted) may be mapped to a resource through an encoding process. In addition, the message to be targeted may be scrambled with cell ID or radio network temporary identification (RNTI) after encoding and allocated to a channel. For example, the RNTI may be separately defined in a specification for an emergency message. For example, encoding for control information may be performed using, e.g., a polar code, and encoding for data information may be performed using, e.g., a low density parity check (LDPC) code. It is also possible to perform encoding using the polar code or the LDPC code regardless of a type of information (control information, data, etc.). When receiving a message, the terminal 320 may estimate a channel using an SSS and a PBCH DMRS, and decode the message to be targeted using a result thereof.

According to another embodiment of the present disclosure, configuration information, e.g., a payload size, for a message to be targeted may be fixedly set between a base station and a terminal. Herein, data may be decoded by applying a fixed code rate. In this case, the payload size is not separately set in system information or RRC signaling, so signaling load may be minimized.

Resource allocation information for the message to be targeted may be allocated non-fixedly (or dynamically). In this case, a NOR may consist of a resource (or a channel) for the resource allocation information and a resource for message data. In order to non-fixedly allocate the resource allocation information for the message to be targeted, the NOR may be classified into several types (or modes) of a control information channel (or a resource) and a message data channel. The base station may inform the terminal in advance of this type through the system information or the RRC signaling.

Hereinafter, an embodiment of a type of NOR configuration will be described in detail with reference to FIG. 4.

Figure 4:
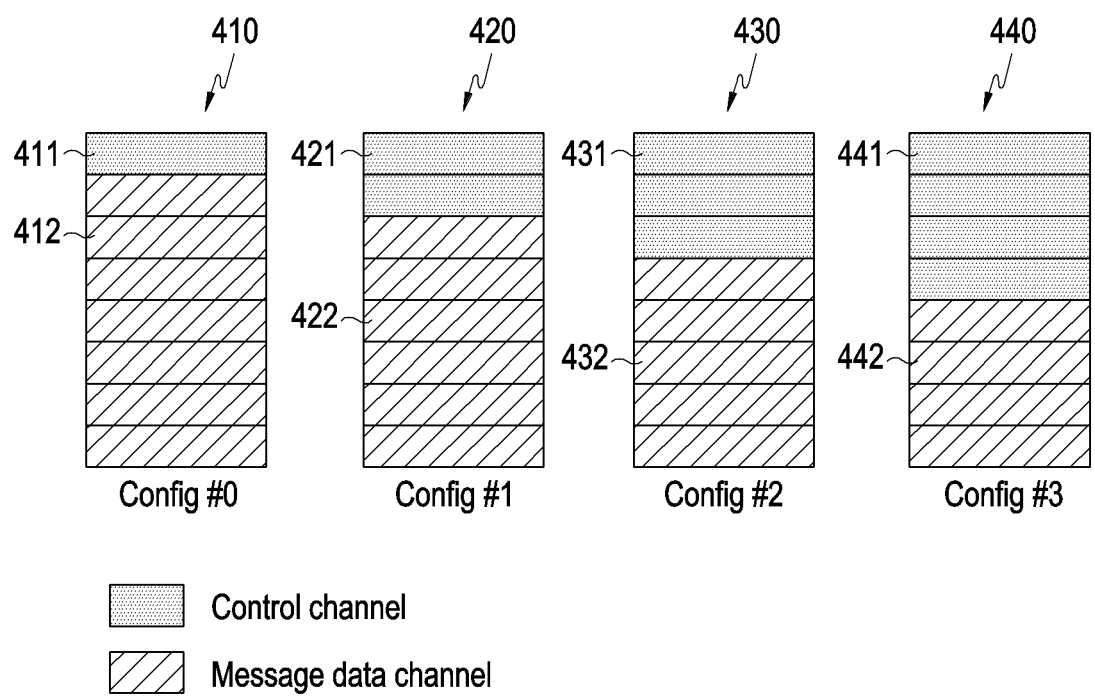
FIG. 4 illustrates a type of resource allocation information according to an embodiment of the present disclosure.

FIG. 4 illustrates a type of resource allocation information according to an embodiment of the present disclosure.

FIG. 4 shows types (410, 420, 430, and 440) of resource allocation information. For example, in a first type 410 of the resource allocation information, a control channel 411 and a message data channel 412 may be allocated 1:7. In a second type 420 of the resource allocation information, a control channel 421 and a message data channel 422 may be allocated 2:6. In a third type 430 of the resource allocation information, a control channel 431 and a message data channel 432 may be allocated 3:5. In a fourth type 440 of the resource allocation information, a control channel 441 and a message data channel 442 may be allocated 1:1.

Figure 5:
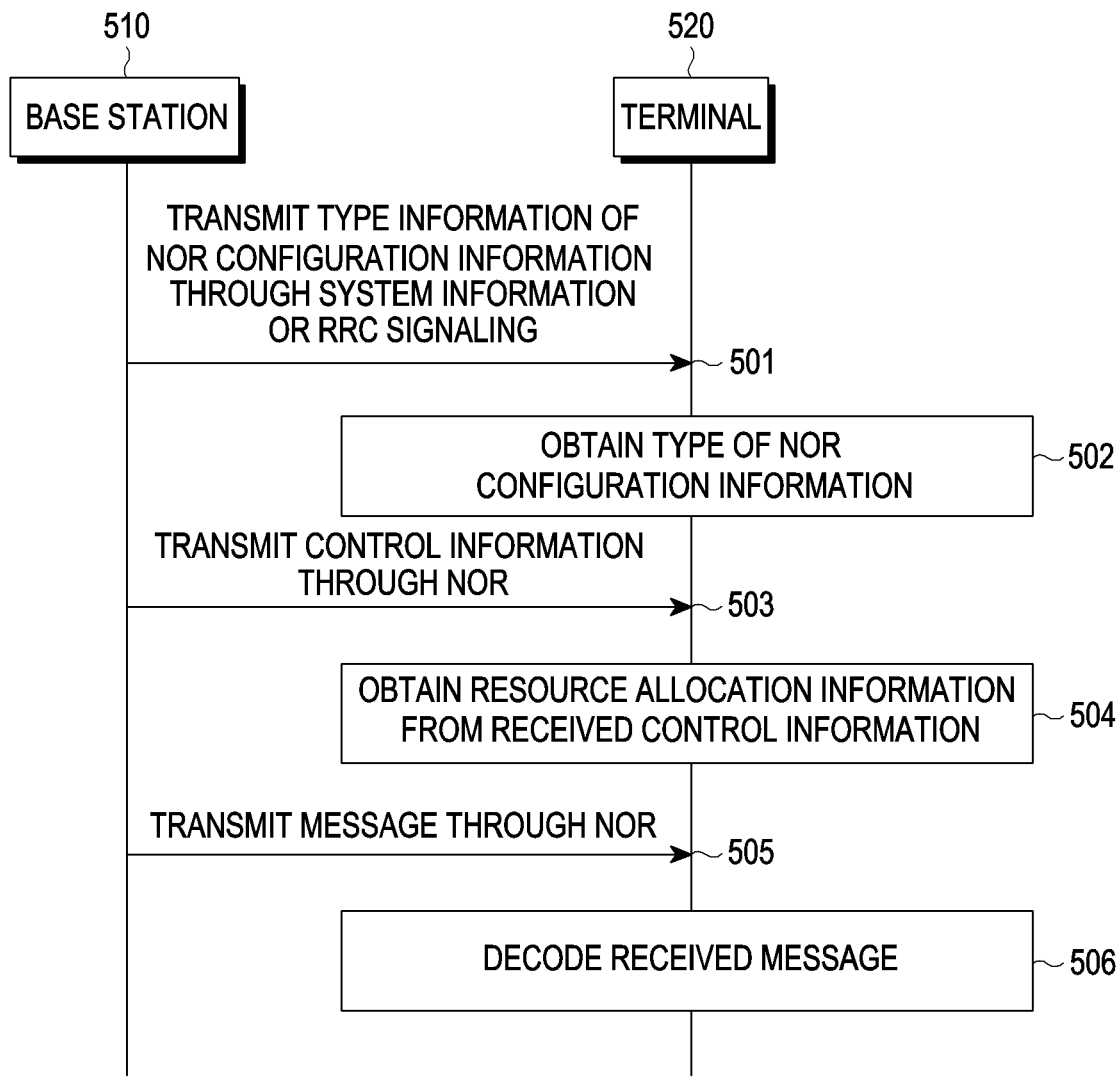
FIG. 5 is a flowchart of a message transmission method according to another embodiment of the present disclosure.

FIG. 5 is a flowchart of a message transmission method according to another embodiment of the present disclosure.

According to FIG. 5, a base station 510 transmits (501) type information of a NOR (or NOR configuration information) to a terminal 520 through system information or RRC signaling. The terminal 520 obtains/determines/identifies (502) a type of a NOR transmitted from the base station 510 from the type information of the NOR configuration information. The base station 510 transmits (503) control information through the NOR. The terminal 520 obtains/determines/identifies (504) resource allocation information based on the received control information. The base station 510 transmits (505) a message through the NOR. The terminal 520 decodes (506) the received message based on the obtained resource allocation information.

Herein, the terminal 520 may decode a control channel and a message data channel transmitted through the NOR based on a resource setting type of a control channel and a message data channel set by a system in order to receive a message. In addition, the terminal 520 may know the number of resource elements (REs) of the message data channel through a type set by the system. Herein, the resource allocation information transmitted on the control channel may be limited to a payload size level.

A signal may be scrambled with information such as cell ID or RNTI. A terminal receiving the signal performs de-correlation on the received signal using a predefined sequence. For example, if an access point (AP) transmits port ID or a transmission unit signals transmission unit ID, the terminal may perform de-correlation on the received signal to identify whether the AP or the transmission unit is available. The port ID of the AP or the transmission unit ID may be repeatedly transmitted at a location of the NOR included in each SSB burst in an SSB burst set according to setting of a burst set of an SSB and multiple bandwidth parts (BWPs). So, hearability for the port ID of the AP or the transmission unit ID may be improved. In addition, additional resource waste may be minimized using the NOR.

Hereinafter, various embodiments for a message or signal used for specific purpose through a NOR will be described with reference to FIGS. 6 to 10.

Figure 6:
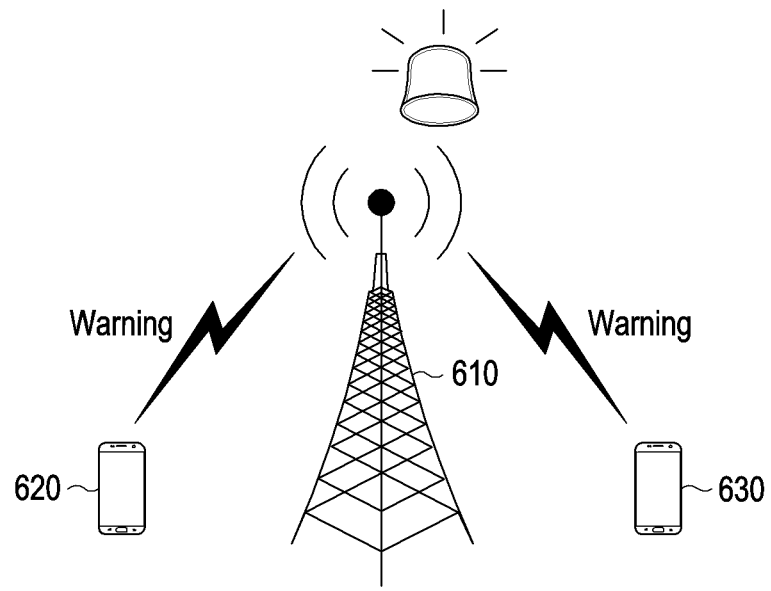
FIG. 6 is a diagram for describing transmission and reception for a message transmitted through a NOR according to an embodiment of the present disclosure.

FIG. 6 is a diagram for describing transmission and reception for a message transmitted through a NOR according to an embodiment of the present disclosure.

A base station 610 in an area where a catastrophe or a disaster occurs may transmit an emergency message to terminals 620 and 630. In this case, the base station 610 may transmit the emergency message through a NOR.

For example, the terminals 620 and 630 may detect a synchronization block if the terminals 620 and 630 are powered on or handed over. In this case, the terminals 620 and 630 may detect the emergency message broadcasted/transmitted through the NOR. So, the terminals 620 and 630 may detect the emergency message when obtaining system information.

Figure 7:
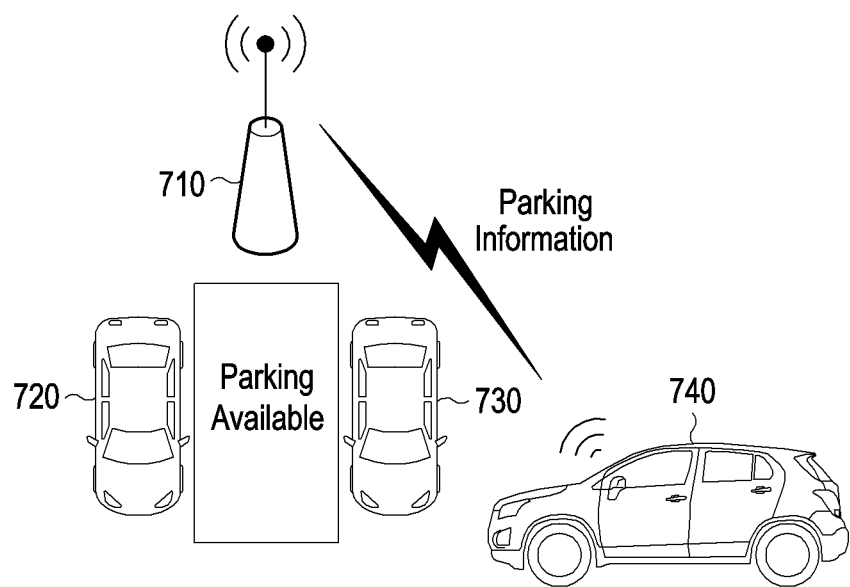
FIG. 7 is a diagram for describing transmission and reception for a message transmitted through a NOR according to another embodiment of the present disclosure.

FIG. 7 is a diagram for describing transmission and reception for a message transmitted through a NOR according to another embodiment of the present disclosure.

It is difficult for a signal from a base station to reach a parking lot (for example, an underground parking lot within a building).

For example, if vehicles (for example, vehicles having a communication terminal) 720 and 730 start or enter the inside of a parking lot, a wireless communication function may inevitably be turned on or the vehicle 720 and 730 may be inevitably handed over. In this case, an AP 710 may broadcast/transmit information related to parking through a NOR. For example, the vehicles 720 and 730 may receive information about a place where the parking is possible through the NOR. Alternatively, the vehicles 720 and 730 may receive various information related to the parking, such as information about parking fee, information about parking time, and/or the like through the NOR.

For another example, a vehicle 740 may be connected to the other vehicles 720 and 730 through a device to device (D2D) communication. In this case, the vehicle 740 may transmit various messages related to parking to the other vehicles 720 and 730 through the NOR.

Figure 8:
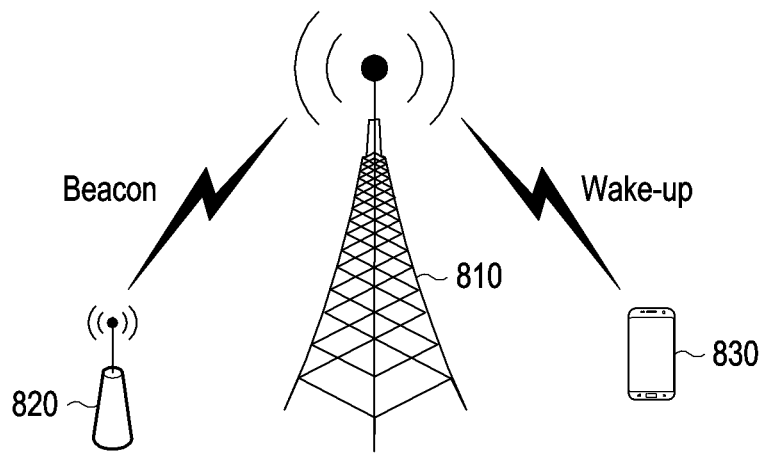
FIG. 8 is a diagram for describing transmission and reception for a signal transmitted through a NOR according to an embodiment of the present disclosure.

FIG. 8 is a diagram for describing transmission and reception for a signal transmitted through a NOR according to an embodiment of the present disclosure.

A beacon signal is a signal used for a terminal 830 or a small-cell 820 to track a synchronization signal. Therefore, the beacon signal needs to be received even in an environment in which a propagation situation is not good. A NOR may be used to ensure stability of the beacon signal.

For example, a base station 810 may transmit the beacon signal to the terminal 830 or the small-cell 820 using the NOR.

A wake-up signal is a signal for waking up the terminal 830 in an off state. For example, the base station 810 may transmit the beacon signal to the terminal 830 using the NOR.

Figure 9:
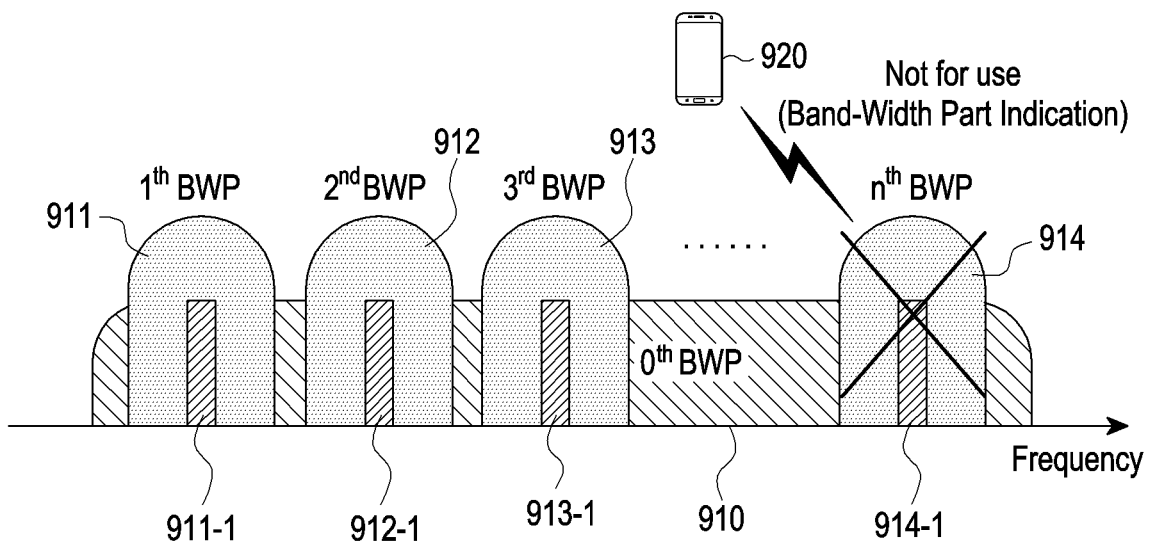
FIG. 9 is a diagram for describing transmission and reception of a signal or message transmitted through a NOR according to an embodiment of the present disclosure.

FIG. 9 is a diagram for describing transmission and reception of a signal or message transmitted through a NOR according to an embodiment of the present disclosure.

FIG. 9 shows a BWP (a large BWP for non band-limited terminal) being discussed in an NR specification. Herein, the BWP may be defined in a bandwidth unit. In addition, the BWP may be a predefined bandwidth unit for a terminal to perform synchronization for transmitting and receiving data. Referring to FIG. 9, a large BWP 910 for a non-band limited terminal may include small BWPs 911, 912, 913, and 914 for a band limited terminal. In addition, each of the small BWPs 911, 912, 913, 914 for the band limited terminal may include SSBs 911-1, 912-1, 913-1, and 914-1.

For example, a base station may use the small BWP 913 for a service with specific purpose (e.g., a D2D service, and a vehicular to vehicular (V2V)). In this case, the base station may broadcast or transmit to a terminal a message or signal including an indicator which prevents a terminal 920 which is not a target for the service with the specific purpose from using the small BWP 913 (or an indicator indicating that the small BWP 913 is not allocated to the terminal 920, hereinafter, referred to as a BWP indicator).

In this case, if the BWP indicator is received through a NOR, the terminal 920 may perform detection for a sequence (or a sequence pattern) which is promised in advance in a synchronization signal detection process. In addition, the terminal 920 may identify that the small BWP 913 is not allocated to the terminal 920, and perform an additional process of identifying whether other small BWPs 911, 912, etc., are allocated to the terminal 920.

In the above example, it has been described that the BWP indicator is an indicator that prevents the terminal 920 from using a corresponding BWP. For another example, the BWP indicator may be an indicator that allows the terminal 920 to use the corresponding BWP. In this case, the terminal 920 may perform a synchronization process for a BWP in which the BWP indicator is received.

Figure 10:
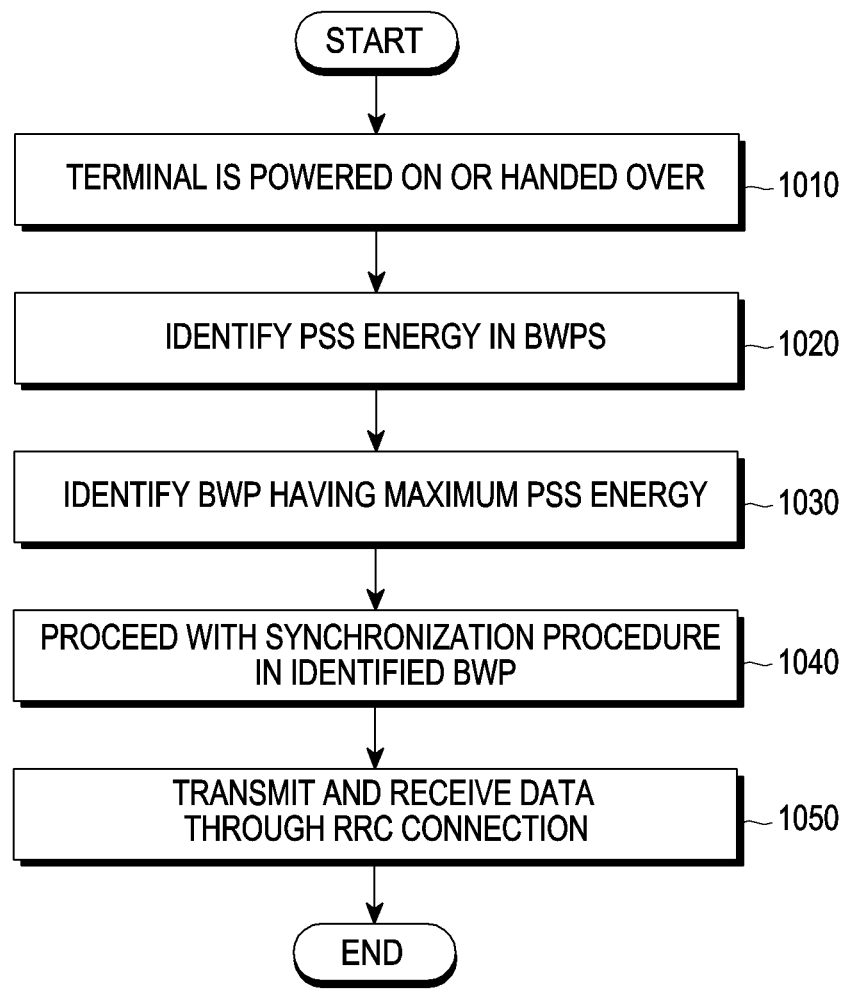
FIG. 10 is a diagram for describing transmission and reception of a signal or message transmitted through a NOR according to an embodiment of the present disclosure.

FIG. 10 is a diagram for describing transmission and reception of a signal or message transmitted through a NOR according to an embodiment of the present disclosure.

A terminal is powered on or handed over (step 1010). The terminal identifies energy of a PSS included in each of a plurality of BWPs (step 1020). Herein, the terminal may identify the energy of the PSS by performing correlation on a signal received through the PSS. The terminal identifies a BWP having maximum PSS energy (step 1030). The terminal proceeds with a synchronization procedure in the identified BWP (step 1040). The terminal performs an RRC connection process to transmit and receive data (step 1050).

Figure 11:
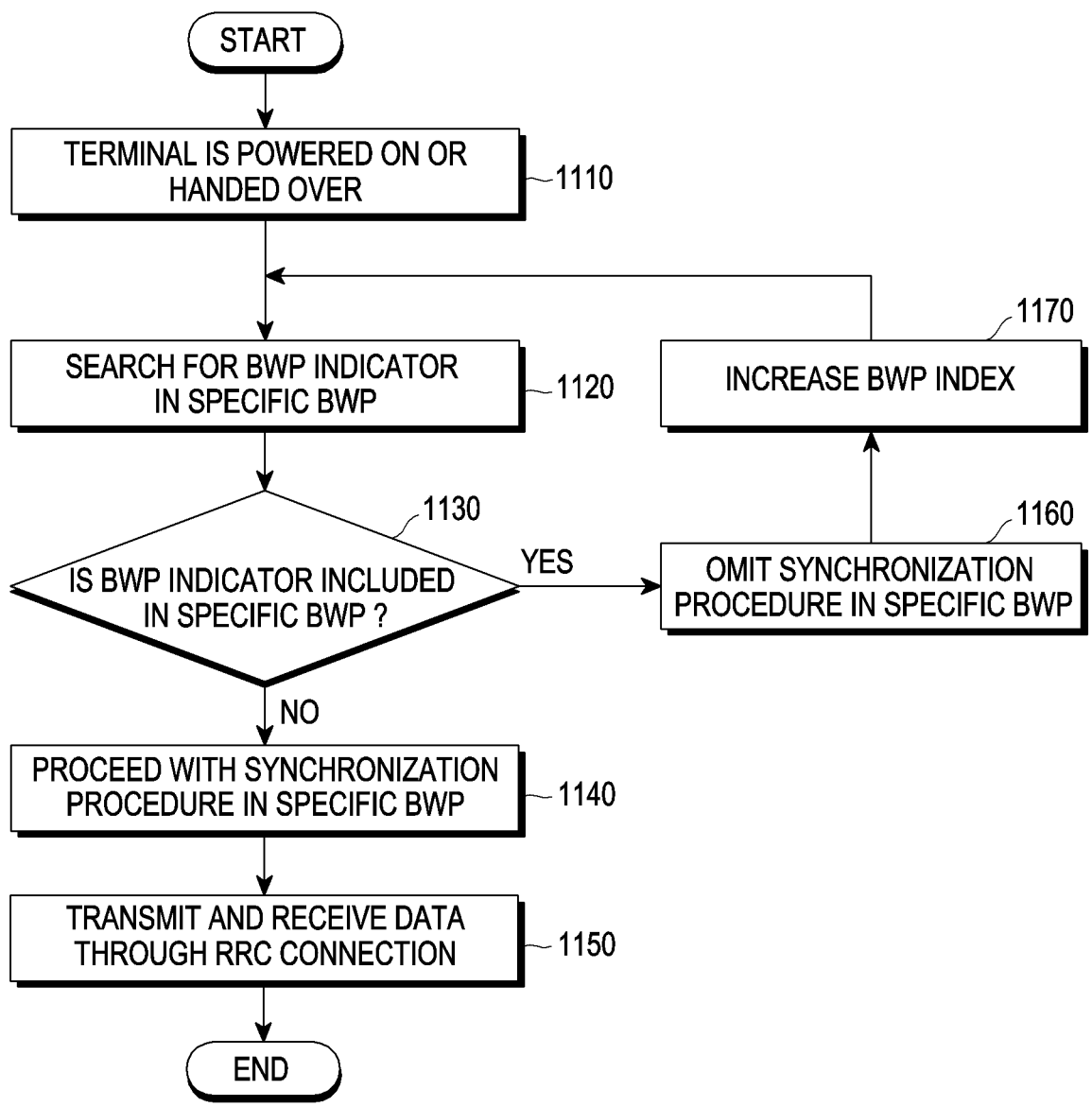
FIG. 11 is a diagram for describing transmission and reception of a signal or message transmitted through a NOR according to another embodiment of the present disclosure.

FIG. 11 is a diagram for describing transmission and reception of a signal or message transmitted through a NOR according to another embodiment of the present disclosure.

A terminal is powered on or handed over (step 1110). The terminal searches for a BWP indicator in a specific BWP (step 1120). Herein, the BWP indicator may be defined in the same way as a BWP indicator described above. The BWP indicator may be an indicator which prevents a terminal which is not a target for a service with specific purpose from using a BWP, or an indicator that the BWP is not allocated to the terminal. The terminal identifies whether the BWP indicator is included in the specific BWP (step 1130). If the BWP indicator is not included in the specific BWP, the terminal proceeds with a synchronization procedure in the specific BWP (step 1140). The terminal transmits and receives data through an RRC connection (step 1150). If the BWP indicator is included in the specific BWP, the terminal omits the synchronization procedure in the specific BWP (step 1160). In addition, the terminal increases an index of a specific BWP to perform a procedure for operations 1120 and 1130 again on another BWP.

As in an embodiment in FIG. 11, if a BWP indicator is transmitted to a terminal, the terminal may more efficiently identify a BWP in which a synchronization process needs to be performed.

Figure 12:
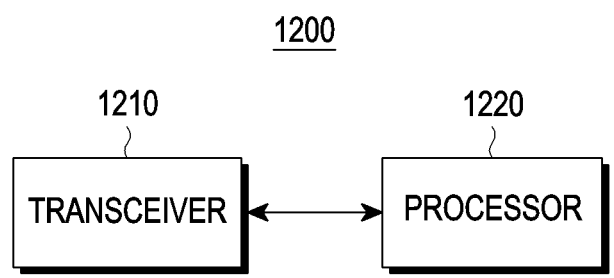
FIG. 12 is a block diagram of a terminal according to an embodiment of the present disclosure.

FIG. 12 is a block diagram of a terminal according to an embodiment of the present disclosure.

Referring to FIG. 12, a terminal 1200 may include a transceiver 1210 and a processor 1220.

The transceiver 1210 may transmit and receive a signal to and from a base station 1300 or another terminal, and/or the like.

The processor 1220 controls the terminal 1200 overall. The processor 1220 may control the transceiver 1210 to receive a first synchronization block (e.g., an SSB) through a first narrow band (or a small BWP) which is predefined for transmitting and receiving data. Also, the processor 1220 may identify whether an indicator (e.g., a BWP indicator) indicating that the first narrow band is not allocated to the terminal 1200 is included in a predefined resource of the first synchronization block. Herein, the processor 1220 may perform synchronization in the first narrow band if the indicator indicating that the first narrow band is not allocated to the terminal 1200 is not included in the predefined resource of the first synchronization block. If the indicator indicating that the first narrow band is not allocated to the terminal 1200 is included in the predefined resource of the first synchronization block, the processor 1220 may not perform the synchronization in the first narrow band.

Herein, the predefined resource of the first synchronization block may be a non-allocated resource other than a resource to which a channel for a synchronization signal is allocated and a resource to which a broadcast channel is allocated, among resources of the first synchronization block. Also, the first synchronization block may be a synchronization signal/physical broadcast channel (PBCH) block (SSB).

If the indicator indicating that the first narrow band is not allocated to the terminal 1200 is included in the predefined resource of the first synchronization block, the processor 1220 may further identify whether an indicator indicating that a second narrow band is not allocated to the terminal 1200 is included in a second synchronization block received through the second narrow band. The processor 1220 may perform synchronization in the second narrow band if the indicator indicating that the second narrow band is not allocated to the terminal 1200 is not included in the second synchronization block.

Herein, the first synchronization block may be a synchronization signal/physical broadcast channel (PBCH) block (SSB). Further, the first synchronization block may be signaled using at least one of a zadoff-chu sequence, a walsh sequence, and a pseudorandom number (PN) sequence.

Figure 13:
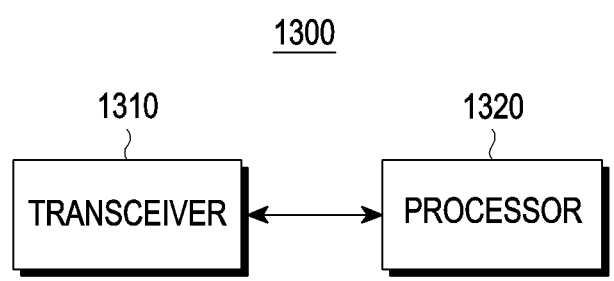
FIG. 13 is a block diagram of a base station according to an embodiment of the present disclosure.

FIG. 13 is a block diagram of a base station according to an embodiment of the present disclosure.

Referring to FIG. 13, a base station 1300 may include a transceiver 1310 and a processor 1320.

The transceiver 1310 may transmit and receive a signal to and from a terminal 1200.

The processor 1320 controls the base station 1300 overall. The processor 1320 may generate a first synchronization block. The processor 1320 may control the transceiver 1310 to transmit a predefined resource of the first synchronization block to the terminal 1200 through a predefined first narrow band for transmitting and receiving data. Herein, if an indicator indicating that the first narrow band is not allocated to the terminal 1200 is not included in the predefined resource of the first synchronization block, synchronization may be performed in the first narrow band.

If the indicator indicating that the first narrow band is not allocated to the terminal 1200 is included in the predefined resource of the first synchronization block, the synchronization may not be performed in the first narrow band.

Herein, the predefined resource of the first synchronization block may be a non-allocated resource other than a resource to which a channel for a synchronization signal is allocated and a resource to which a broadcast channel is allocated, among resources of the first synchronization block. Also, the first synchronization block may be a synchronization signal/physical broadcast channel (PBCH) block (SSB).

If the indicator indicating that the first narrow band is not allocated to the terminal 1200 is included in the predefined resource of the first synchronization block, the processor 1320 may further transmit a second synchronization block through a second narrow band. In this case, if the indicator indicating that the second narrow band is not allocated to a terminal 1200 is not included in the second synchronization block, synchronization may be performed in the second narrow band.

Herein, the first synchronization block may be a synchronization signal/physical broadcast channel (PBCH) block (SSB). Further, the first synchronization block may be signaled using at least one of a zadoff-chu sequence, a walsh sequence, and a pseudorandom number (PN) sequence.

Figure 14:
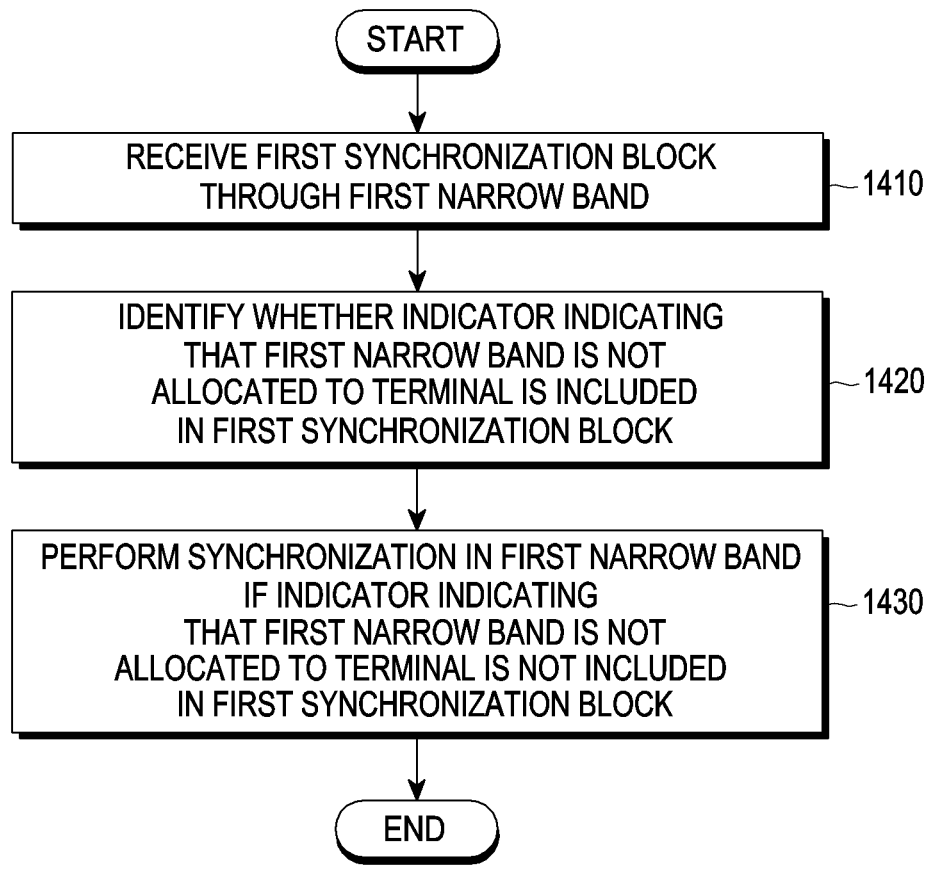
FIG. 14 is a flowchart for describing a method to transmit and receive data according to an embodiment of the present disclosure.

FIG. 14 is a flowchart for describing a method to transmit and receive data according to an embodiment of the present disclosure.

A method to transmit and receive data according to an embodiment of the present disclosure may include an operation 1410 of receiving a first synchronization block through a first narrow band, an operation 1420 of identifying whether an indicator indicating that the first narrow band is not allocated to a terminal is included in a predefined resource of the first synchronization block, and an operation 1430 of performing synchronization in the first narrow band if the indicator indicating that the first narrow band is not allocated to the terminal is not included in the predefined resource of the first synchronization block.

Herein, the synchronization may not performed in the first narrow band if the indicator indicating that the first narrow band is not allocated to the terminal is included in the predefined resource of the first synchronization block.

Herein, the predefined resource of the first synchronization block may be a non-allocated resource other than a resource to which a channel for a synchronization signal is allocated and a resource to which a broadcast channel is allocated, among resources of the first synchronization block. Further, the first synchronization block may be a synchronization signal/physical broadcast channel (PBCH) block (SSB).

The method to transmit and receive the data may further include an operation of identifying whether an indicator indicating that a second narrow band is not allocated to the terminal is included in a second synchronization block received through the second narrow band if the indicator indicating that the first narrow band is not allocated to the terminal is included in the predefined resource of the first synchronization block.

Herein, synchronization may be performed in the second narrow band if the indicator indicating that the second narrow band is not allocated to the terminal is not included in the second synchronization block.

Herein, the first synchronization block may be a synchronization signal/physical broadcast channel (PBCH) block (SSB). The first synchronization block may be signaled using at least one of a zadoff-chu sequence, a walsh sequence, or a pseudorandom number (PN) sequence.

A method to transmit and receive data according to another embodiment of the present disclosure may include receiving size information for a message received at the terminal through system information; and decoding the message received at the terminal based on the size information for the message received at the terminal. Herein, the message received at the terminal may be allocated to a non-allocated resource other than a resource to which a channel for a synchronization signal is allocated and a resource to which a broadcast channel is allocated, among resources of a synchronization block received through a narrow band predefined for transmitting and receiving the data, and then be received.

In this case, the size information for the message received at the terminal may be related to a size of a payload.

Herein, the channel for the synchronization signal may be related to at least one of a primary synchronization signal (PSS) and a secondary synchronization signal (SSS), and the broadcast channel may be related to a physical broadcast channel (PBCH).

Herein, the message received at the terminal may be encoded using a polar code and a low density parity check (LDPC) code. The message received at the terminal may be scrambled based on radio network temporary identification (RNTI).

A method to transmit and receive data according to still another embodiment of the present disclosure may include receiving type information of a configuration for a predefined resource through system information; receiving control information through the predefined resource based on the received type information; and receiving the data based on the control information. Herein, the predefined resource may be a non-allocated resource other than a resource to which a channel for a synchronization signal is allocated and a resource to which a broadcast channel is allocated, among resources of a synchronization block received through a narrow band predefined for transmitting and receiving the data.

In this case, the control information may include information about a size of a payload.

Herein, the channel for the synchronization signal may be related to at least one of a primary synchronization signal (PSS) and a secondary synchronization signal (SSS), and the broadcast channel may be related to a physical broadcast channel (PBCH).

Herein, the data may be encoded using a polar code and a low density parity check (LDPC) code. The data may be scrambled based on radio network temporary identification (RNTI).

Figure 15:
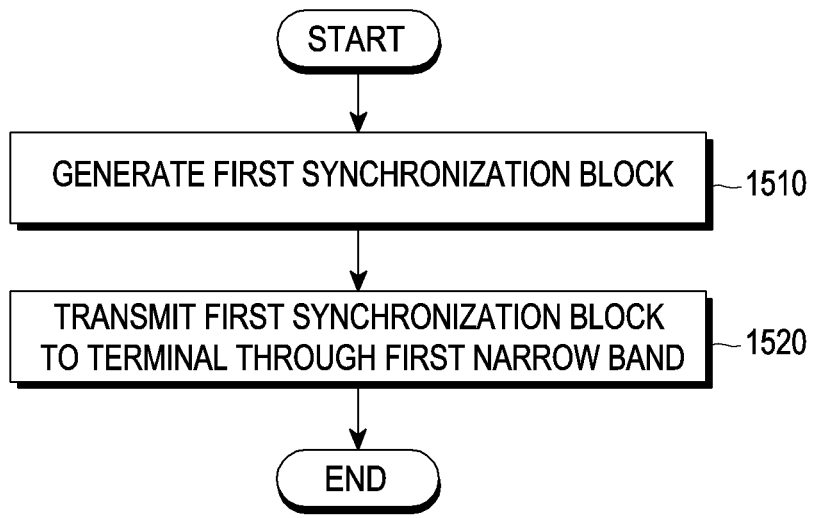
FIG. 15 is a flowchart for describing a method to transmit and receive data according to another embodiment of the present disclosure.

FIG. 15 is a flowchart for describing a method to transmit and receive data according to an embodiment of the present disclosure.

A method to transmit and receive data according to an embodiment of the present disclosure may include an operation 1510 of generating a first synchronization block, and an operation 1520 of transmitting the first synchronization block to a terminal through a first narrow band.

Herein, if an indicator indicating that the first narrow band is not allocated to the terminal is not included in a predefined resource of the first synchronization block, synchronization may be performed in the first narrow band.

If the indicator indicating that the first narrow band is not allocated to the terminal is included in the predefined resource of the first synchronization block, the synchronization may not be performed in the first narrow band.

Herein, if the indicator indicating that the first narrow band is not allocated to the terminal is included in the predefined resource of the first synchronization block, a second synchronization block may be further transmitted through a second narrow band.

In this case, if an indicator indicating that the second narrow band is not allocated to the terminal is not included in the second synchronization block, synchronization may be performed in the second narrow band.

Here, the first synchronization block may be a synchronization signal/physical broadcast channel (PBCH) block (SSB). Further, the first synchronization block may be signaled using at least one of a zadoff-chu sequence, a walsh sequence, and a pseudorandom number (PN) sequence.

Meanwhile, a power control method according to various embodiments of the present disclosure described above may be provided in each server or device to be implemented by a computer-executable program code and executed by a processor in a state stored in various non-transitory computer readable media.

For example, a non-transitory computer readable medium storing a program may be provided, and the program performs an operation of receiving a first synchronization block through a first narrow band, an operation of identifying whether an indicator indicating that the first narrow band is not allocated to a terminal is included in a predefined resource of the first synchronization block, and an operation of performing synchronization in the first narrow band if the indicator indicating that the first narrow band is not allocated to the terminal is not included in the predefined resource of the first synchronization block.

For another example, a non-transitory computer readable medium storing a program may be provided, and the program performs an operation 1510 of generating a first synchronization block, and an operation 1520 of transmitting the first synchronization block to a terminal through a first narrow band.

Methods according to embodiments described in the claims or specification of the present disclosure may be implemented in a form of a hardware, a software, or a combination of the hardware and the software.

In a case of being implemented in the software, a computer readable storage medium storing one or more programs (a software module) may be provided. The one or more programs stored in the computer readable storage medium are configured to be executable by one or more processors in an electronic device. The one or more programs include instructions that cause the electronic device to execute methods according to embodiments described in the claims or specification of the present disclosure.

These programs (a software module and a software) may be stored in a random access memory, a non-volatile memory including a flash memory, a Read Only Memory (ROM), a Electrically Erasable Programmable Read Only Memory (EEPROM), a magnetic disc storage device, a Compact Disc-ROM (CD-ROM), Digital Versatile Discs (DVDs) or an optical storage device of a different type, and a magnetic cassette. Alternatively, these programs may be stored in a memory composed of a combination of some or all of them. Also, a plurality of component memories may be included.

The program may be stored in an attachable storage device which may be accessed through a communication network composed of a communication network such as an internet, an intranet, a Local Area Network (LAN), a wide LAN (WLAN), or a Storage Area Network (SAN), or a combination thereof. This storage device may access a device performing an embodiment of the present disclosure though an external port. In addition, a separate storage device on a communication network may access the device performing an embodiment of the present disclosure.

In specific embodiments of the present disclosure described above, a component included in the disclosure is expressed in singular or plural according to a specific embodiments presented. However, the singular or plural expressions are appropriately selected for a situation presented for convenience of explanation, so the present disclosure is not limited to the singular component or plural components. Further, a component expressed in plural may be composed of singular component, or a component expressed in singular may be composed of plural components.

Although specific embodiments of the disclosure have been described above, various changes may be made thereto without departing from the scope of the disclosure. Thus, the scope of the disclosure should not be limited to the above-described embodiments, and should rather be defined by the following claims and equivalents thereof.

The invention claimed is:

1. A method for a terminal in a wireless communication system, the method comprising:
   receiving a first synchronization block through a first narrow band predefined for transmitting and receiving data;
   identifying whether an indicator indicating that the first narrow band is not allocated to the terminal is included in a predefined resource of the first synchronization block; and
   performing synchronization in the first narrow band in case that the indicator indicating that the first narrow band is not allocated to the terminal is not included in the predefined resource of the first synchronization block.

2. The method of claim 1, wherein the predefined resource of the first synchronization block is a non-allocated resource other than a resource to which a channel for a synchronization signal is allocated and a resource to which a broadcast channel is allocated, among resources of the first synchronization block.

3. The method of claim 1, wherein the first synchronization block is a synchronization signal/physical broadcast channel (PBCH) block (SSB).

4. The method of claim 1, wherein the synchronization is not performed in the first narrow band in case that the indicator indicating that the first narrow band is not allocated to the terminal is included in the first synchronization block.

5. The method of claim 4, further comprising:
   further identifying whether an indicator indicating that a second narrow band is not allocated to the terminal is included in a second synchronization block received through the second narrow band in case that the indicator indicating that the first narrow band is not allocated to the terminal is included in the first synchronization block; and
   performing synchronization in the second narrow band in case that the indicator indicating that the second narrow band is not allocated to the terminal is not included in the second synchronization block.

6. A terminal in a wireless communication system, the terminal comprising:
   a transceiver; and
   a processor configured to:
      control the transceiver to receive a first synchronization block through a first narrow band predefined for transmitting and receiving data;
      identify whether an indicator indicating that the first narrow band is not allocated to the terminal is included in a predefined resource of the first synchronization block; and
      perform synchronization in the first narrow band in case that the indicator indicating that the first narrow band is not allocated to the terminal is not included in the predefined resource of the first synchronization block.

7. The terminal of claim 6, wherein the predefined resource of the first synchronization block is a non-allocated resource other than a resource to which a channel for a synchronization signal is allocated and a resource to which a broadcast channel is allocated, among resources of the first synchronization block.

8. The terminal of claim 6, wherein the first synchronization block is a synchronization signal/physical broadcast channel (PBCH) block (SSB).

9. The terminal of claim 6, wherein the synchronization is not performed in the first narrow band in case that the indicator indicating that the first narrow band is not allocated to the terminal is included in the first synchronization block.

10. The terminal of claim 9, wherein the processor is configured to:
further identify whether an indicator indicating that a second narrow band is not allocated to the terminal is included in a second synchronization block received through the second narrow band in case that the indicator indicating that the first narrow band is not allocated to the terminal is included in the first synchronization block; and
perform synchronization in the second narrow band in case that the indicator indicating that the second narrow band is not allocated to the terminal is not included in the second synchronization block.

11. A base station in a wireless communication system, the base station comprising:
a transceiver; and
a processor configured to:
generate a first synchronization block; and
control the transceiver to transmit the first synchronization block to a terminal through a first narrow band predefined for transmitting and receiving data,
wherein synchronization is performed in the first narrow band in case that an indicator indicating that the first narrow band is not allocated to the terminal is not included in a predefined resource of the first synchronization block.

12. The base station of claim 11, wherein the predefined resource of the first synchronization block is a non-allocated resource other than a resource to which a channel for a synchronization signal is allocated and a resource to which a broadcast channel is allocated, among resources of the first synchronization block.

13. The base station of claim 11, wherein the first synchronization block is a synchronization signal/physical broadcast channel (PBCH) block (SSB).

14. The base station of claim 11, wherein the synchronization is not performed in the first narrow band in case that the indicator indicating that the first narrow band is not allocated to the terminal is included in the first synchronization block.

15. The base station of claim 14,
wherein the processor is configured to further transmit a second synchronization block through a second narrow band in case that the indicator indicating that the first narrow band is not allocated to the terminal is included in the first synchronization block, and
wherein synchronization is performed in the second narrow band in case that an indicator indicating that the second narrow band is not allocated to the terminal is not included in the second synchronization block.

16. A method for a base station in a wireless communication system, the method comprising:
generating a first synchronization block; and
transmitting the first synchronization block to a terminal through a first narrow band predefined for transmitting and receiving data,
wherein synchronization is performed in the first narrow band in case that an indicator indicating that the first narrow band is not allocated to the terminal is not included in a predefined resource of the first synchronization block.

17. The method of claim 16, wherein the predefined resource of the first synchronization block is a non-allocated resource other than a resource to which a channel for a synchronization signal is allocated and a resource to which a broadcast channel is allocated, among resources of the first synchronization block.

18. The method of claim 16, wherein the first synchronization block is a synchronization signal/physical broadcast channel (PBCH) block (SSB).

19. The method of claim 16, wherein the synchronization is not performed in the first narrow band in case that the indicator indicating that the first narrow band is not allocated to the terminal is included in the first synchronization block.

20. The method of claim 19, further comprising:
transmitting a second synchronization block through a second narrow band in case that the indicator indicating that the first narrow band is not allocated to the terminal is included in the first synchronization block,
wherein synchronization is performed in the second narrow band in case that an indicator indicating that the second narrow band is not allocated to the terminal is not included in the second synchronization block.

* * * * *